Jan. 22, 1957 W. J. COSMOS 2,778,166
CONTACT WHEEL AND RIM FOR THE SAME
Filed March 17, 1955 2 Sheets-Sheet 1
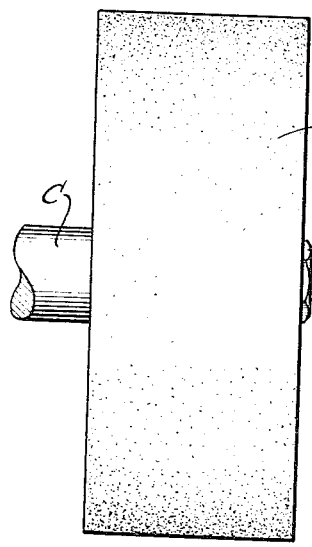
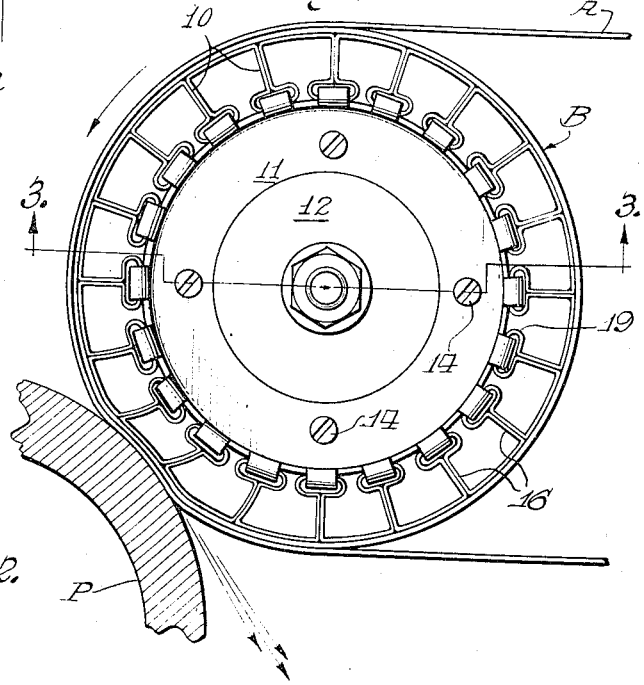
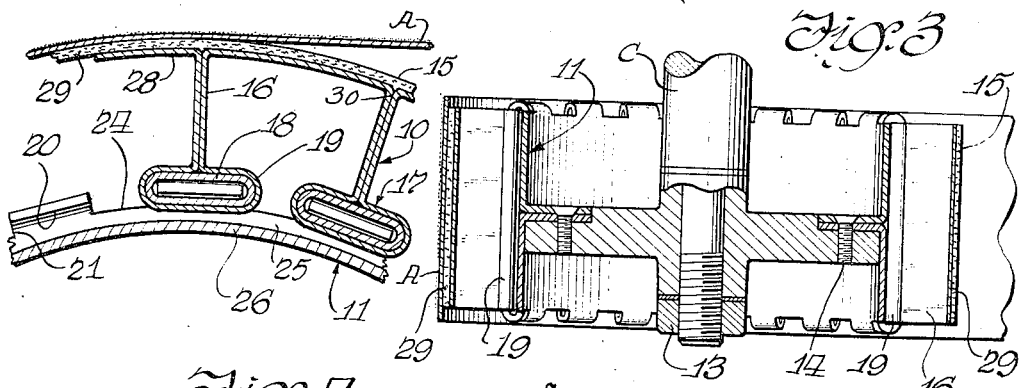
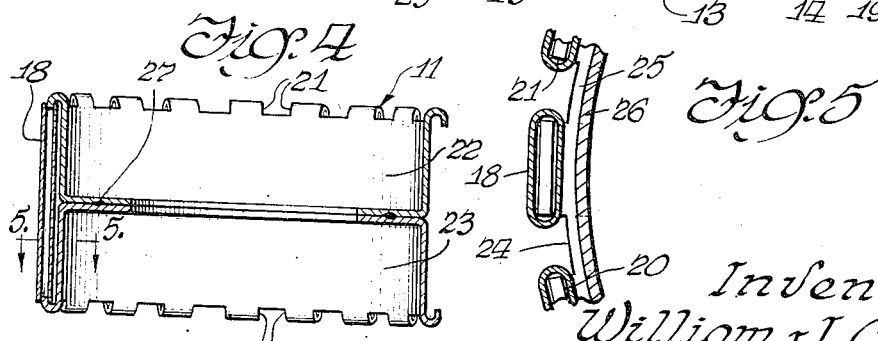
Inventor
William J. Cosmos
by Frank D. Prager
Attorney Jan. 22, 1957 W. J. COSMOS 2,778,166
CONTACT WHEEL AND RIM FOR THE SAME
Filed March 17, 1955 2 Sheets-Sheet 2
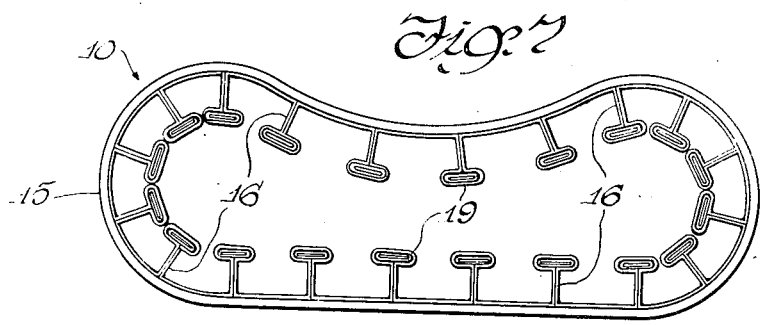
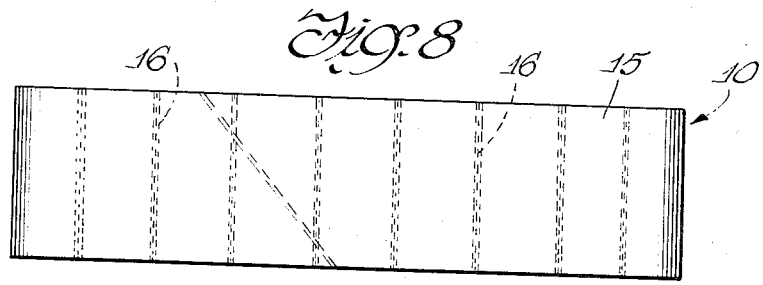
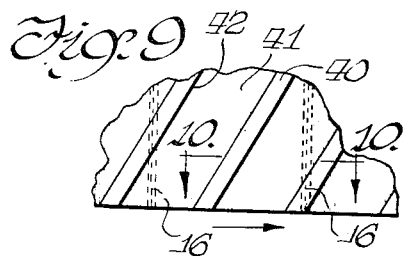
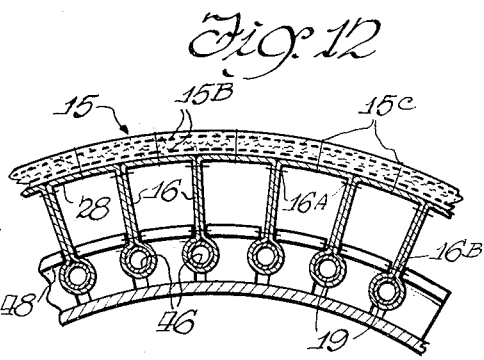
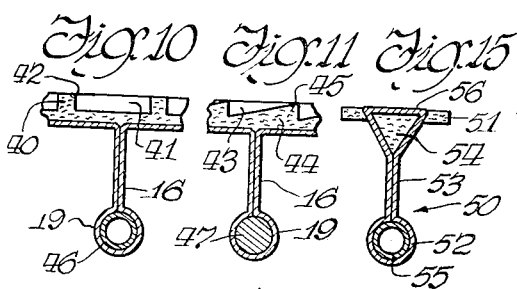
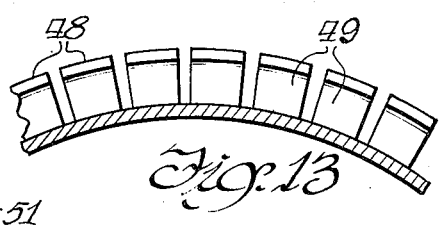
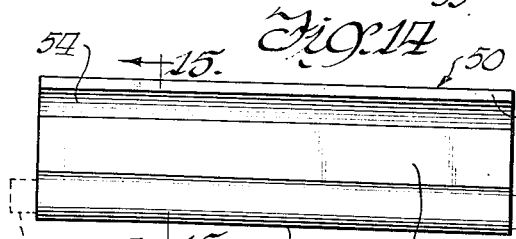
Inventor
William J. Cosmos
by Frank D. Prager
Attorney

United States Patent Office 2,778,166
Patented Jan. 22, 1957

2,778,166
CONTACT WHEEL AND RIM FOR THE SAME
William J. Cosmos, Chicago, Ill.
Application March 17, 1955, Serial No. 494,942
6 Claims. (Cl. 51—141)

This invention relates to contact wheels for driving and cushioning abrasive belts and particularly to an improved removable rim for such a wheel.

The new rim is improved mainly as to interchangeability. This is one of the main features required, in view of the extensive and varied nature of operations with abrasive belts. Contact wheel rims require frequent interchange because they wear out and also because different operations require different working surfaces of the contact wheel, not only of the abrasive belt.

In the past abrasive belts were freely interchanged but contact wheels and the rims thereof were substantially unchangeable. At least the interchangeable between hub and rim of a contact wheel was much more difficult than for instance, the interchange between tire and hub of wheels of automobiles, bicycles, etc. One of the reasons was that contact wheels generally operate at extremely high velocities and still require extremely high degrees of dynamic as well as static balance, under extremely difficult conditions due to changeable work piece pressure, etc. The new contact wheel rim is freely interchangeable without loss of balance, either static or dynamic.

The new contact wheel is further improved as to the cost of the various parts, the simplicity of handling them, their efficiency in operation, and in other respects.

These improvements have been obtained by the provision of a contact wheel rim which to some extent resembles the abrasive belts driven thereby in that it constitutes a kind of removable, endless, flexible belt, as distinguished from the unremovable and/or non-flexible rim units used in the past.

More specifically the new rim comprises an endless flexible belt; certain ribs thereon, and additional parts secured to the ribs. The ribs form a series of flexible attachments, spaced around the inside of the belt, secured thereto and extending across the same and short radial distances inwardly therefrom, so that a length of the new wheel rim or belt has much the appearance of a caterpillar. The attached ribs or caterpillar legs extend inwardly to inner edges, parallel with and separate from one another; and a rigid member is secured to each inner edge for securing the same to a hub structure.

Details of these constructive features, objects and advantages will become clear from the disclosure of preferred embodiments which follows.

In the drawing:

Figure 1 is a front elevation of a first contact wheel incorporating this invention.

Figure 2 is a side elevation of the wheel of Figure 1 with a workpiece added.

Figure 3 is a cross section through Figure 2 along lines 3—3 in that figure.

Figure 4 is a detail from Figure 3.

Figure 5 is an enlarged sectional detail from Figure 4, the section being taken along lines 5—5 in that figure.

Figure 6 is a detail similar to Figure 5 but with parts of Figure 3 added.

Figure 7 is a side elevation of a removable contact wheel rim according to this invention, without hub structure.

Figure 8 is a plan view of the rim of Figure 7.

Figure 9 shows the rim of a second contact wheel hereunder, in a view similar to Figure 8.

Figure 10 is a partial section through Figure 9 along lines 10—10 in that figure.

Figure 11 shows the rim of a third contact wheel hereunder, in a view similar to Figure 10.

Figure 12 shows parts of a fourth contact wheel hereunder, in a view similar to Figure 6.

Figure 13 shows an unassembled detail from Figure 12, in a view similar to Figure 5.

Figure 14 is a section through an element for a more substantially modified contact wheel hereunder, in a view similar to Figures 10 and 11, the plane of section being shown at 14—14 in Figure 15; and Figure 15 is a side view of the element of Figure 14.

Referring first to Figures 1 to 8:

An abrasive belt A is driven by the contact wheel B mounted on a drive shaft C. A workpiece P, either flat or curved, is ground or polished by a portion of belt A, cushioned by wheel B.

The contact wheel B consists of a flexible rim 10, a rigid tire 11 and a rigid hub 12. The rim is removable from the tire. Desirably, the tire is also removable from the hub, but the tire and hub together form a rigid hub structure.

The hub 12 is mounted on the shaft C by a nut 13, as usual. The tire 11 is mounted on the hub 12 by screws 14, in the manner known from United States Patent 2,673,470 of the present applicant. The removable flexible rim 10 is mounted on the tire 11 in the manner which will now be described.

Said rim 10 comprises an endless, flexible belt 15, as best shown in Figures 6, 7 and 8. A series of flexible ribs 16 are spaced around the inside of the belt 15 and secured thereto. They extend across the belt and short radial distances therefrom. They are shown as flat, uniformly spaced and uniformly constructed extensions. Their purpose is to hold the belt 15 to the tire 11. For this purpose each rib holder or extension 16 forms a kind of tab secured edgewise to the inside of the belt 15. The inner edges of these ribs or tabs are parallel with and separate from one another. A rigid connector-stabilizer element 17 is secured to the inner edge of every tab 16, for attachment to the hub structure.

In the present embodiment (Figure 5) the elements 17 are shown as comprising flattened metal tubes 18. Portions 19 of the flexible ribs 16 surround the respective tubes, with close fit. Each end of each tube 18 is held to the hub structure by inserting in such end the tip 20 of a finger 21 formed on a side edge portion of the tire 11 (Figures 3 to 6). For this purpose the tire 11 may best be formed by joining together a pair of identical tire sections 22, 23, each having a cross section in the approximate form of a figure 2 (see upper left hand portion of Figure 4). The fingers 21, separated by recesses 24, form parts of side edge portions 25, at right angles with the cylindrical body 26 of the tire. Inner parts 27 of the tire cross sections serve to attach the tire to the hub, as disclosed in the aforementioned patent. Outer portions of said cross sections serve to provide the finger tips 20. The tire unit may be made from steel or aluminum sheeting, by well known forming procedures. It may have some little resilience to aid in inserting the finger tips 20 in the rigid tubes 18; but compared with the flexible rim 10, the tire is substantially rigid, in order to provide a stable mounting.

The preferred form of the removable flexible rim 10, as shown in Figure 6, comprises a strongly tension-resistant, endless fabric element 28, made of canvas or the like, forming a principal part of the belt 15 and also substantially forming the ribs 16 and their inner, tube-surrounding loop portions 19. The present rim construction also comprises an outer layer 29 of rubberlike material, such as natural or synthetic rubber, co-extensive with and firmly bonded to those portions of the fabric element 28 which form part of the belt 15. This outer layer 29 serves to tie said portions together and to provide a proper gripping and cushioning element for the abrasive belt A. Without such an element, rapid rotation of the wheel might excessively expand the rim; also, localized stiffening effects might be applied by the tabs 16 and their attachment portions 30, connecting them with the belt 15, interfering with proper grinding and polishing. These stiffening effects are uniformly distributed over the area of the belt 15, by the superposed layer 29. The layer can be quite thin. In fact the entire removable flexible rim can be very light, inexpensive and handy.

This removable flexible rim can be manufactured in various manners. It has been found most desirable to utilize a mold of circular shape, with an outer diameter equal the inner diameter of the circular belt. In the periphery of this mold, cavities are formed corresponding with the shape of the inwardly projecting ribs and their terminal loops. The fabric element 28 can then be taken from a suitable reel or other supply and adapted to the mold and its cavities. For this purpose one end of the fabric element is simply held to the mold and successive portions are pushed into the successive cavities and stretched over the intermediate mold areas, until a complete ring has been formed. The ends are then slightly overlapped and spliced, preferably in a diagonal manner as shown in Figure 8. Next, the layer 29 of rubberlike material is molded onto this fabric, in a conventional outer mold wherein the fabric and the inner mold are inserted.

The manner in which the layer 29 of rubberlike material is applied to the fabric 28 is subject to variations. In a preferred form of the wheel, best illustrated in Figure 6, this layer 29 comprises a body of fabric material, as does the inner fabric 28, but the fabric material of the outer layer 29 is impregnated with rubber. Material of this kind is available on the market, for instance as insulating material. It can be superimposed over the material 28, applied to the forming mold, by simply stretching a plain circular or cylindrical band of the rubberized material over the periphery of the fabric-covered mold. Thereafter the inner mold with the two fabric covers thereon is inserted in the outer mold and heated, so that a firm bond is created between the rubber and both fabric bodies of the rim.

An alternate form of the outer layer 29 is illustrated in Figures 9 and 10. Here the outer layer 29A of rubberlike material is substantially thicker than a mere band of rubber-impregnated fabric usually is. In the outer or working surface of this thick layer 29A serrations are formed, providing so-called land portions 40 separated from one another by grooves 41. The grooves and land portions extend across the rim surface diagonally to the sides of this surface, and are uniformly spaced apart peripherally of the wheel. As shown in Figures 9 and 10 the land areas 40 constitute a major part of the thickness of the layer 29A and their profile is substantially rectangular, whereby the working surface of the rim can be refinished in substantially identical form when it has been worn down by hard or prolonged use.

Such a serrated working surface is particularly useful when the contact wheel serves to drive and cushion a relatively coarse abrasive belt for grinding operations wherein substantial amount of stock must be removed from the workpiece. In such operation the abrasive particles overlying the front edge 42 of every successive land portion 40 apply cutting actions upon the workpiece surface in the approximate manner of a file. For this purpose the edges 42 must be backed up by land portions 40 of some appreciable mass and toughness. It is for this reason that the land areas are fairly wide. For the same reason the layer 29A will frequently be made from relatively hard rubberlike materials.

These features, in turn, have a tendency to reduce the flexibility of the rim and its ability to adapt itself to the contour of the workpiece. This tendency is unfortunate and attempts have therefore been made to provide both toughness for stock removal and flexibility for adaptation to the workpiece, by means of cross serrations in the workpiece surface. In the present case it may be noted that the inner ribs 16, extending at right angles to the sides of the belt, act in effect as cross serrations, traversing the diagonal outer ribs or land portions 40. As shown in the co-pending application for United States Letters Patent Serial No. 429,811, filed May 14, 1954, it has been discovered that such cross serrations must be staggered so as to avoid a highly undesirable "marking" of the workpiece; in other words the main and cross serrations must be so arranged that upon rotation of the wheel their intersections travel in separate parallel circular paths. This has been found to be as desirable in the present case as in the forms shown in said application.

Depending upon the nature of the workpiece and of the work to be performed thereon many modifications may be required or preferred as to the exact form of cross serration, basic serration or generally work face formation. For instance in cases where the workpiece material tends to "blind" the abrasive belt or fill the interstices between abrasive particles with abraded material it is frequently desirable to make the grooves between the land portions triangular rather than rectangular in cross section. An example is shown in Figure 11, with triangular grooves 43 between relatively narrow land areas 44. Substantial backing for the working edges 45 is still provided by the triangular or saw-tooth form of serration. However, refinishing of the belt in identical form is impossible in this modification.

These examples as to possible forms of serration are believed to be sufficient for present purposes. They illustrate the importance of interchangeability for the contact wheel rim.

The new removable rim can also be modified as to the precise manner of obtaining the interchangeable but safe and balanced mounting upon the tire and hub. In this connection reference is made to Figures 12 and 13 together with Figures 9 to 11. Instead of the flattened connector tubes plain cylindrical tubes 46 may be secured to the inner edges of the ribs 16 or at least the tubes may have cylindrical cross section between their ends, whereby relatively thin and light tube material will provide firm and stable mounting for all portions of the rim, between the tube ends directly attached to the tire. It is also possible to utilize solid bars 47 as mounting members, instead of any kind of hollow tubes.

Instead of mounting and locating the mounting members by specially formed finger tips on the side edge portions of the tire, conventional mounting holes may be provided in such portions and the tubes or rods inserted thereon. On the other hand it is sometimes preferable to provide finger tips 48 on relatively long fingers 49 and to insert them over, not in, the reinforced loops 19.

Figure 12 shows also a modified construction of the belt 15A. This member is here shown as two-ply reinforced rubber fabric, with reinforcement strands 15B. It may be secured to the inner fabric 28 by stitches or staples 15C instead of or in addition to the rubber bonding or cementing as described. Likewise stitches or staples 16A, 16B may be used to force the two plies of fabric 28, in tabs 16, to stay together and not to separate due to centrifugal and/or flexing actions. The balance and general performance of the rim is often improved by the bonding of the fabric in such form, whatever means may be used to secure the bond.

As shown in Figures 14 and 15 it is also possible to modify the form and construction of the ribs, aside from the manner in which they are combined into a rim and connected with a hub or tire structure. An individual rib 50 is here shown, comprising an outer or belt-engaging section 51 of approximately triangular, inwardly pointing cross section, an inner or hub-engaging part 52 of tubular construction and an intermediate flat portion 53. The three portions 51, 52, 53 may substantially consist of fabric impregnated with rubber-like material; a considerable mass of such material 54 being provided in the outer portion 51. A rigid insert 55 is provided in the hub-engaging loop portion 52, in any one of the manners previously explained. In order to combine such individual ribs into a complete operative contact wheel a peripheral belt is suitably wound about the outer surfaces 56. Such a belt may have abrasives incorporated therein, as does the belt A described above, although modifications are possible in this respect also.

I claim:

1. A removable rim for a contact wheel comprising an endless flexible belt; a series of flexible ribs spaced around the inside of the belt, secured thereto and extending across the same and short radial distances inwardly therefrom to inner edges parallel with and separate from one another; each flexible rib substantially consisting of a fabric-reinforced member impregnated with rubberlike material, having a tubular inner edge portion, a flat portion extending outwardly therefrom and an outer portion the cross sectional area of which expands from the flat portion, said several portions being substantially as long as the rim is wide; and a rigid member secured to each inner edge for securing the same to a hub structure.

2. A rim as claimed in claim 1 comprising an endless, flexible, substantially cylindrical fabirc belt surrounding the endless flexible belt with flexible ribs secured thereto, the belts being bonded together, to provide at least two plies of fabric in the belt portions of the rim.

3. A rim as claimed in claim 1 comprising a peripheral layer of rubberlike material bonded to and surrounding the outside of the endless flexible belt, said layer being thick in comparison with the belt itself.

4. A rim as claimed in claim 3 wherein the peripheral working surface of the layer is serrated.

5. A rim as claimed in claim 4 wherein the serrated surface comprises land areas forming part of the layer and grooves separating the land areas, the land areas and grooves extending diagonally across the rim and across the ribs.

6. A rim as claimed in claim 5 wherein the ribs spaced around the inside of the belt and the serrations of said layer are so staggered relative to one another that their intersections, upon rotation of the wheel, travel in separate, parallel, circular paths.

References Cited in the file of this patent

UNITED STATES PATENTS

| | | |
|---|---|---|
| 540,828 | Casgrain | June 11, 1895 |
| 550,062 | Webster | Nov. 19, 1895 |
| 1,749,393 | Pflimlin | Mar. 4, 1930 |
| 2,162,279 | Herchenrider | June 13, 1939 |
| 2,257,864 | Sheehan | Oct. 7, 1941 |
| 2,387,296 | Rochwald | Oct. 23, 1945 |
| 2,387,297 | Rochwald | Oct. 23, 1945 |
| 2,483,422 | Larson | Oct. 4, 1949 |
| 2,548,166 | Larson | Apr. 10, 1951 |
| 2,581,270 | McVey | Jan. 1, 1952 |
| 2,627,705 | Bruner | Feb. 10, 1953 |
| 2,709,879 | Larson | June 7, 1955 |